United States Patent Office 3,623,181
Patented Nov. 30, 1971

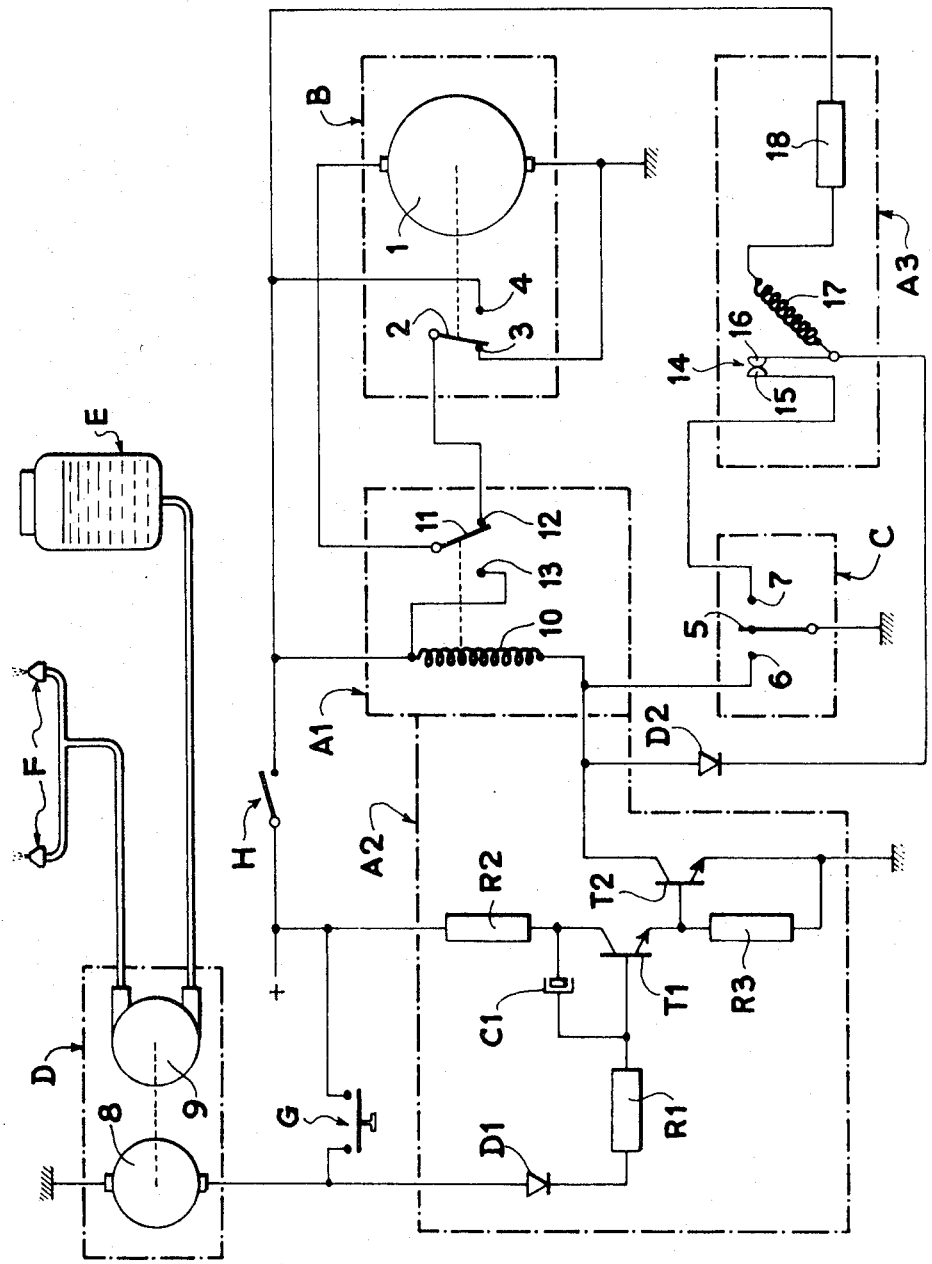

3,623,181
DEVICE FOR CLEANING A WINDSCREEN
Christian Bailly, Le Pecq, France, assignor to Automobiles Peugeot, Paris, and Regie Nationale des Usines Renault, Billancourt, France
Filed Jan. 28, 1970, Ser. No. 6,386
Claims priority, application France, Feb. 20, 1969, 6904266
Int. Cl. B60s 1/02
U.S. Cl. 15—250.02     1 Claim

ABSTRACT OF THE DISCLOSURE

A windscreen cleaner in which timing means associated with a circuit controlling the pump of a window washer is adapted to produce, as soon as said means supply the pump with current, the immediate operation of the wiper motor and continuation of said operation during a suitable number of cycles after the end of the operation of the washer.

---

The present invention relates to an improved device for cleaning a windscreen which combines the action of a window wiper with that of a window washer.

Window wipers are known which are driven by an electric motor having one or two speeds and combined with a device affording a fixed stop and an electromagnetic braking by a short-circuiting of the armature. Window wipers are also known having an intermittent operation and devices are known which associate a window washer pump control with a window wiper control which ensures operation of the latter so long as the liquid of the window washer is under pressure, operation of the window wiper ceasing as soon as the pressure drops.

The object of the invention is to provide a windscreen cleaner which combines the advantages of the various known arrangements.

The invention provides such a device comprising an electric window washer pump and a window wiper motor having a device affording a fixed stop and electromagnetic braking, said motor being supplied with current either directly for continuous operation or through delay means for intermittent operation, wherein there is added to the circuit controlling the window washer pump delay means adapted to produce, as soon as said pump is supplied with current, the immediate operation of said motor and the continuation of said operation during a suitable number of cycles after the end of the spraying of the windscreen.

Further features and advantages of the invention will be apparent from the ensuing description with reference to the accompanying drawing.

In the drawing:
The single figure shows a detailed diagram of a device for cleaning a windscreen according to the invention.

With refeernce to this figure, the illustrated device comprises three units $A_1$, $A_2$, $A_3$ which constitute the control for the window wiper of the vehicle, a unit B comprising the window wiper motor with the reverser 2 therefor controlled by a fixed stop cam (not shown) driven by the motor.

The reverser 2 is on contact 3 when the window wiper occupies a withdrawn or parked position on the windscreen and on the contact 4 when the window wiper is in any other position.

The device according to the invention further comprises a window wiper control reverser C connected between the units $A_2$ and $A_3$, this reverser being capable of occupying three different positions 5, 6 and 7 namely, stop, permanent operation and intermittent operation respectively, a unit D comprising a motor 8 and a window washer pump 9, a container E containing a reserve supply of cleaning liquid connected to the inlet of the pump 9, nozzles F of the window washer connected to the outlet of the pump 9, a push contact G controlling the pump of the window washer, directly connected to the + pole of the vehicle battery so that it is possible to spray the windscreen for cleaning purposes with no need to close the master switch H of the vehicle.

Unit $A_1$ is a relay controlling the motor 1 of the window wiper. It comprises a coil 10 adapted to actuate a reverser 11 having two studs 12 and 13. This reverser is on stud 13 when the coil 10 is energized. This relay $A_1$ is connected to the + pole of the battery of the vehicle through a master switch H and to the output of the unit $A_2$.

Unit $A_2$ is a circuit delay adapted to ensure operation of the window wiper during and after each utilization of the pump of the window washer. It comprises a transistor $T_1$ of the NPN type whose base is connected to a terminal of the motor 8 of the unit D below the contact G through a resistor $R_1$ and a diode $D_1$.

The emitter of the transistor $T_1$ is connected to the base of a second transistor $T_2$ of the NPN type and its collector is connected to the positive terminal of the battery of the vehicle through a resistor $R_2$. A capacitor $C_1$ is connected between the base and the collector of the transistor $T_1$. The emitter of the transistor $T_2$ is earthed, its collector is connected to the terminal of the coil 10 of the relay $A_1$ which is remote from the master switch H and its base is earthed through a resistor $R_3$.

Unit $A_3$ is a device of known type driving the window wiper in an intermittent manner.

This device is illustrated in a simplified manner by a switch 14 having a fixed contact 15 and a movable contact 16 which open when a filament is heated by the passage of a current. This filament is fed through a resistor 18.

These three units are completed by a diode $D_2$ adapted to preclude a return of current, though the filament 17 and the resistor 18, to the commutator of the transistor $T_2$.

The device just described operates in the following manner.

When the vehicle is stationary and the master switch is open the various switches or reversers are in the position indicated in the figure. In the delay circuit $A_2$ the capacitor $C_1$ is charged and the transistors $T_1$ and $T_2$ are turned off.

When the vehicle is in use, with switch H closed, there is no change in circuit $A_2$. The capacitor $C_1$ remains charged and the transistors $T_1$ and $T_2$ remain turned off. No current passes through the coil 10 and the reverser remains in the position shown in the figure.

For a continuous operation of the window wiper, the switch H being closed, the reverser C is placed on the stud 6. A current is set up in the coil 10 which tilts the reverser onto the stud 13. The motor 1 is then supplied with current. Stoppage is achieved by placing the reverser C into position 5. The coil 10 no longer carries current and the reverser 11 moves back to the stud 12. So long as the window wiper has not resumed its withdrawn position, the motor 1 remains supplied through the circuit H, 4, 2, 12 and 11. When the withdrawn position is reached, the reverser 2 controlled by the motor 1, moves to the position 3 and the armature of this motor is short-circuited through 3, 2, 12 and 11.

For an intermittent operation of the window wiper, the reverser C is placed on the stud 7 and this establishes the current on one hand in the coil 10 through the diode $D_2$ and the switch 14 and, on the other hand, in the filament 17 through the resistor 18 and the same switch 14.

The coil 10 causes the reverser 11 to shift to position 13 and causes the motor 1 to start up. Similarly, the progressive heating of the filament 17 produces, after a few strokes of the window wiper, the shifting of the contact 16 and the opening of the switch 14. The coil 10 is no longer fed and the reverser 11 moves back to the stud 12.

The window wiper is stopped in the same way as for the continuous operation. At the end of a given time, the filament having cooled down, the switch 14 closes again and the cycle is repeated until the reverser C is brought to position 5.

For washing the windscreen, the push-button contact is closed and this causes the motor 8 of the pump 9 to operate. Simultaneously, the capacitor $C_1$ discharges and turns on the transistor $T_1$ which in turn turns on the transistor $T_2$. As the emitter and collector of the latter are short-circuited, a current is set up in the coil 10 and this shifts the reverser 11 to the stud 13 and causes the motor 1 to start up.

After opening of the contact G, the pump of the window washer stops operating but the motor 1 and the window wiper remain in operation so long as the capacitor $C_1$ is not recharged.

The difference of potential between the terminals of the capacitor $C_1$ progressively increases until the threshold for turning off the transistor $T_1$ is reached, which turns off the transistor $T_2$ and cuts off the current in the coil 10. The motor 1 is stopped in the same way as before.

The number of strokes of the wiper after opening the contact G must be at least three to ensure a correct cleaning of the windscreen and at the most five so as to avoid excessive stress on the drive mechanism caused by the rubbing of the window wiper blades on the dry windscreen.

The resistor $R_1$ precludes deterioration of the transistor $T_1$ by absorbing the positive pulse when the contact G is depressed.

The diode $D_1$ prevents the capacitor $C_1$ from discharging through the resistor $R_1$ and the pump motor 8 when the contact G is open.

The delay device $A_2$ can be made to operate irrespective of the position of the reverser C. If the latter is in position 7 (intermittent operation), the two controls are superimposed and the operation of the window washer always produces at least the number of strokes provided by the delay circuit $A_2$.

Although a specific embodiment of the invention has been described, many modifications and changes may be made therein without departing from the scope of the invention.

Having now described my invention what I claim and desire to secure by Letters Patent is:

1. A windscreen cleaner comprising an electric window washer, a pump for said washer, a window wiper, a motor for said wiper and having a device affording a fixed stop and electromagnetic braking, means for supplying current to said motor, a circuit controlling said pump, timing means associated with said circuit and adapted to produce, as soon as said means supply said pump with said current, the immediate operation of said motor and the continuation of said operation during a suitable number of cycles after the end of the operation of said window washer, said timing means comprising a first transistor having a base and a collector and a second transistor, and a capacitor, whose charging time is so calculated as to determine the operating time of said motor after the stoppage of said pump, said capacitor being connected between said base and said collector.

References Cited
UNITED STATES PATENTS

| | | | |
|---|---|---|---|
| 2,977,623 | 4/1961 | Schmitz | 15—250.02 |
| 3,068,506 | 12/1962 | Oishei | 15—250.02 |
| 3,148,399 | 9/1964 | Ziegler | 15—250.02 |
| 3,161,901 | 12/1964 | Kolb et al. | 15—250.02 |
| 3,262,042 | 7/1966 | Amos | 15—250.12 X |
| 3,339,123 | 8/1967 | Riester | 318—443 |

PETER FELDMAN, Primary Examiner

U.S. Cl. X.R.

15—250.12; 318—443